United States Patent [19]

Hansen et al.

[11] Patent Number: 4,867,877

[45] Date of Patent: Sep. 19, 1989

[54] WASTE DISPOSAL/SEPARATION SYSTEM

[76] Inventors: Harold V. Hansen, 23823 - 178th Ave., N.; Larry A. Toppert, 23811 - 178th Ave., N., both of Cordova, Ill. 61242

[21] Appl. No.: 153,166

[22] Filed: Feb. 8, 1988

[51] Int. Cl.[4] .............................................. B01D 36/04
[52] U.S. Cl. ............................... 210/257.1; 210/258; 210/302; 210/305; 210/311; 210/313; 210/416.1; 210/443; 210/533
[58] Field of Search .................. 210/406, 407, 416.1, 210/433.1, 443, 456, 459, 532.1, 533, 302, 305, 311, 313, 257.1, 258

[56] References Cited

U.S. PATENT DOCUMENTS

| | | | |
|---|---|---|---|
| 281,336 | 7/1883 | Blackmer | 210/302 |
| 528,652 | 11/1894 | Borden | 210/443 |
| 704,244 | 7/1902 | Davis | 210/311 |
| 1,043,455 | 11/1912 | Neil | 210/406 |
| 1,231,477 | 6/1917 | Bibb et al. | 210/311 |
| 1,251,601 | 1/1918 | Weiwoda | 210/456 |
| 1,468,906 | 9/1923 | Inman | 210/533 |
| 1,472,896 | 11/1923 | Alsop | 210/406 |
| 1,630,504 | 5/1927 | Walker | 210/443 |
| 1,822,440 | 5/1928 | Jacobson | 210/533 |
| 2,007,336 | 7/1935 | Malivert | 210/433.1 |
| 2,258,063 | 10/1941 | Meyer | 210/433.1 |
| 2,424,932 | 7/1947 | Juhnsz | 210/407 |
| 2,624,463 | 1/1953 | Freese | 210/443 |
| 2,997,178 | 8/1961 | Lorimir | 210/456 |
| 3,374,894 | 3/1968 | Webster | 210/258 |
| 3,651,944 | 3/1972 | Shuttleworth | 210/406 |
| 3,756,410 | 9/1973 | Moody et al. | 210/305 |
| 4,385,891 | 5/1983 | Ligotti | 210/311 |
| 4,597,871 | 7/1986 | Okouchi et al. | 210/456 |
| 4,738,786 | 4/1988 | Wykoff | 210/416.1 |

FOREIGN PATENT DOCUMENTS

| | | |
|---|---|---|
| 690910 | 9/1930 | France . |
| 759034 | 10/1956 | United Kingdom . |

*Primary Examiner*—Peter Hruskoci
*Assistant Examiner*—Christopher Upton
*Attorney, Agent, or Firm*—Henderson & Sturm

[57] ABSTRACT

A waste removal and/or segregation system for removing liquid and solid waste simultaneously from waste-holding tanks or vessels. The solid matter in the waste is filtered or segregated into one holding area and the liquid waste placed in a separate holding vessel so that each waste material may be independently disposed of in accordance with current EPA requirements. A separation or filtration element is interposed between a conventional liquid waste removal system including a container for the liquid waste and the nozzle applied to the waste material containing both solid and liquid matter. This vessel has an inlet connected to the nozzle and an outlet connected to the vacuum source through the liquid waste storage tank. The novel vessel of this invention has a filtration system that permits the liquid waste to exit for independent disposal while retaining solid matter for independent disposal. The particulate size of the solid waste can be varied by the design parameters of the filter through which the solid waste does not pass.

2 Claims, 2 Drawing Sheets

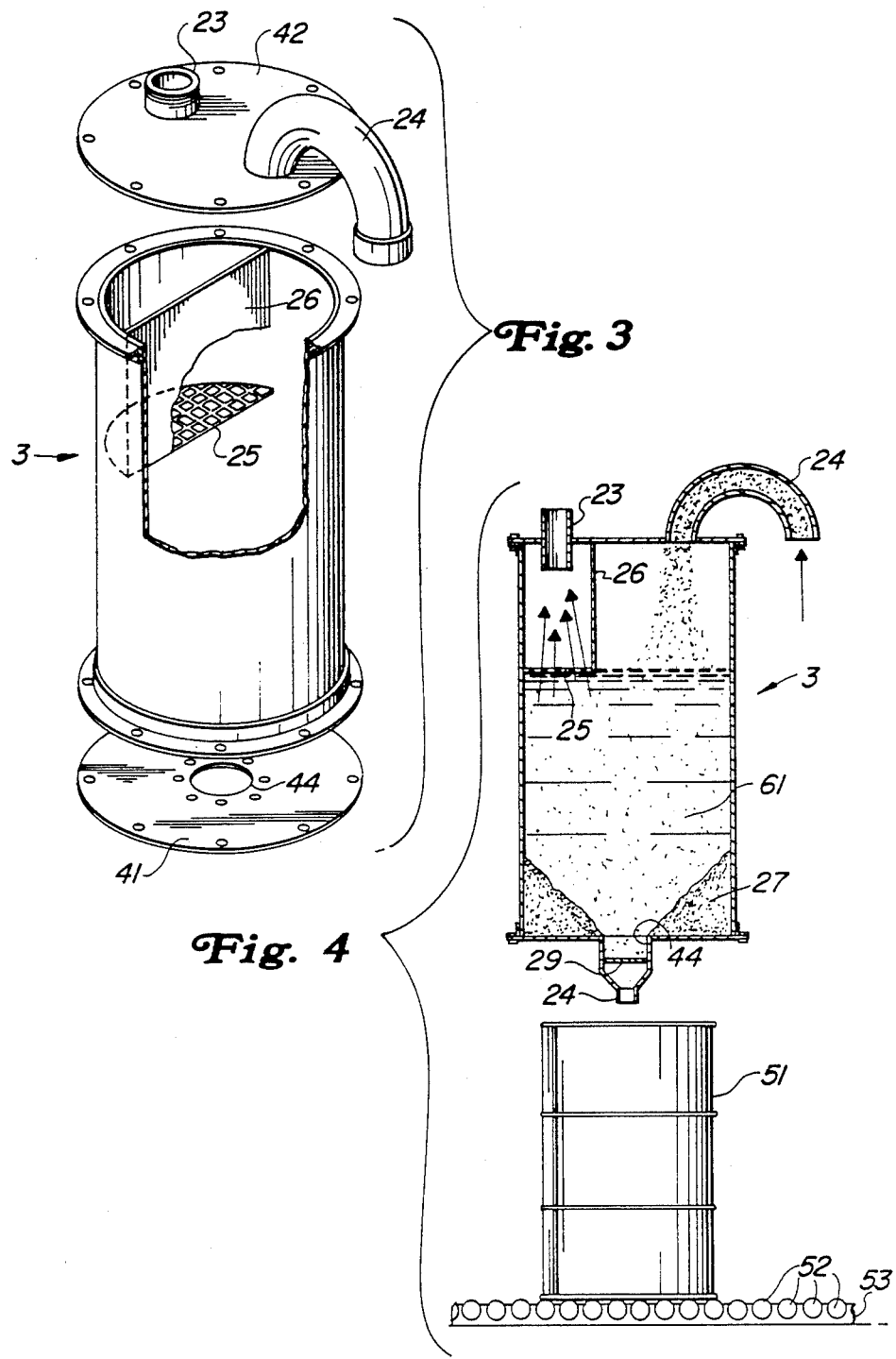

WASTE DISPOSAL/SEPARATION SYSTEM

BACKGROUND OF THE INVENTION

This invention pertains to new and improved vacuum waste removal systems. More specifically, the invention provides a method of simultaneously removing liquid and solid wastes, separating them in the removal process so that each may be disposed of independently. The disposal process for liquid and solid waste varies, depending on chemical content, in accordance with current EPA regulations. Prior to this invention, there have been vacuum systems for removal of liquid waste materials or of dry waste materials, but separate operations were required if liquid and wet solid matter were in the same contained volume.

First the liquid had to be removed from the surface of the wet solids. This could be by vacuum removal or drainage into approved area. The liquid waste had to be disposed of separately. Then the moist solid matter had to be removed. This was done by backhoe or hand filling of approved containers for disposal. The large vacuum systems or filtration systems removed the heavier particles from an air stream or through some filter method so that the air that went to the vacuum system received the filtered air. This was no different than a large vacuum cleaner and indeed was not capable of separating large particulates from liquid. The filtering systems provided in the prior art would normally handle micron sized elements both dry and moist but in the case of chemical and industrial waste which is held in storage tanks, the moist solid waste material sinks to the bottom. There has been no known waste removal system which was capable of handling this problem in one operation. The prior art was very inefficient, costly and in many cases could not meet current EPA regulations because of the exposure of the humans to this moist solid waste during the period of disposal. Contact or exposure of humans to this moist solid waste needed to be eliminated or substantially reduced. This invention permits the removal from the holding tank or other contained volume, simultaneous of the moist solid material and the liquid material where each is separated so that they be disposed of in accordance with current EPA regulations without human contact with the material. The reduction in cost and the improvement in the efficiency by being able to segregate the liquids and the solid waste materials for independent handling is most desirable. The system permits the rapid filling of EPA approved barrels or other approved containers with solid waste material while the liquid waste is separately stored and disposed of under current EPA regulations. From the preceding it can be seen that there is a need for new and improved waste disposal system for use in disposing of combined solid and liquid waste material. The invention is intended to provide this improvement by providing a separation means between the nozzle, which is applied to the combined waste, the liquid waste disposal unit and the vacuum source. The objectives of this invention are to provide a novel and unique method of separating and handling solid and liquid waste while meeting EPA specifications and reducing human hazard. This invention provides a means of separating moist particulate matter waste from the liquid waste. It also provides a method of automatic control of the waste system so that the moist particulate matter can fill the EPA approved containers in which it is to be stored with minimum spillage and exposure of humans to the waste material.

DESCRIPTION OF THE DRAWINGS

Because of the nature of this invention, it is more fully described in reference to the accompanying drawings in which.

FIG. 3 is a cutaway view showing the elements of the novel solid from liquid waste separation vessel and the relationship of the elements in the vessel.

FIG. 4 is a cross-sectional view of the solid waste filtration vessel showing the elements in position and the flow of the material through the vessel.

Figure 1:
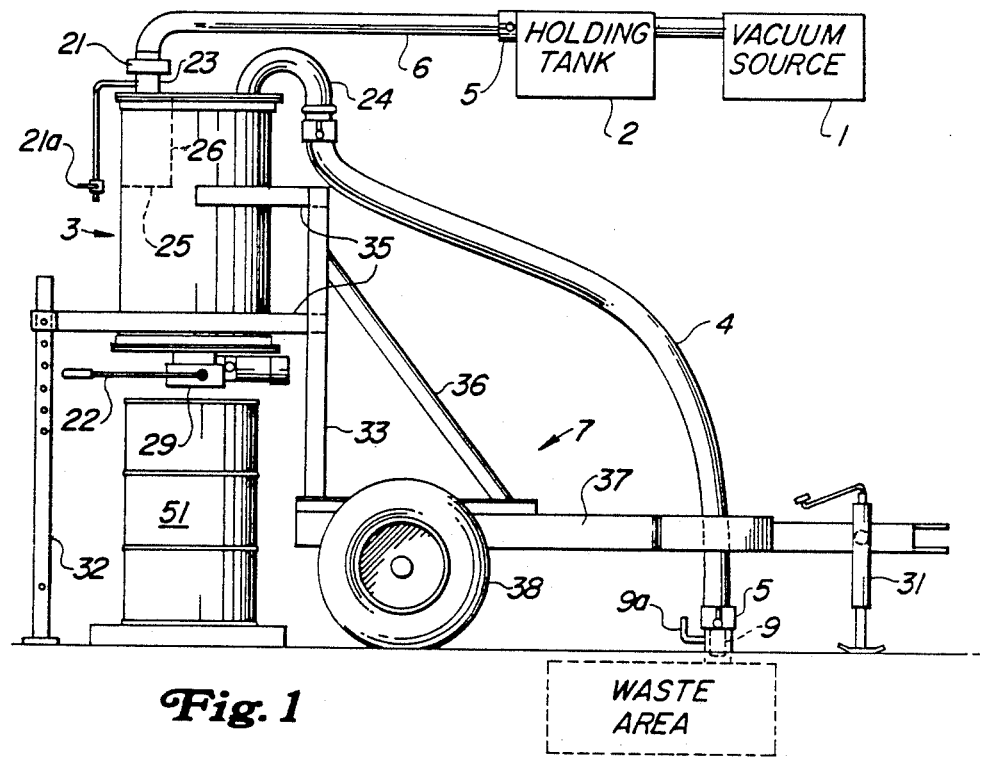
FIG. 1 is a side view of a filtration system including the requisite vacuum source, liquid-holding tank nozzle for sucking up waste and the novel separation element of this invention mounted on a transportable frame. Also shown is the container unit positioned to receive the waste material from the solid water vessel.
Figure 2:
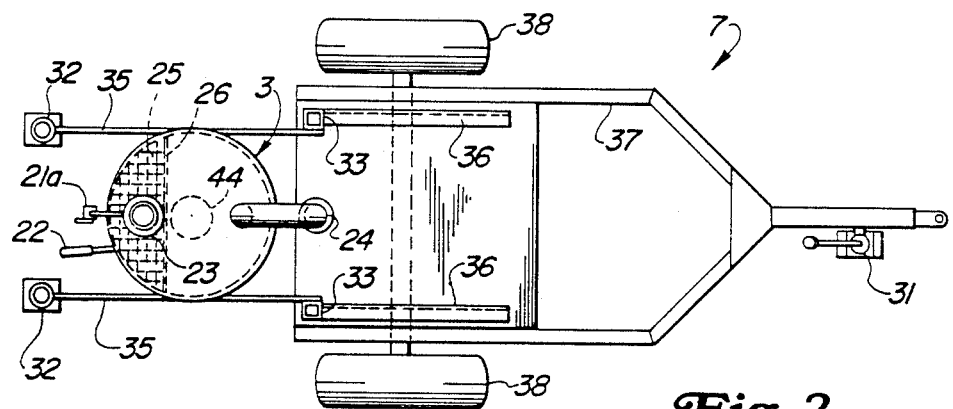
FIG. 2 is a top view showing the controls which permit you to load the waste into barrels without human contact with the waste.

The particular solid waste disposal vessel shown in the drawings is a presently preferred embodiment or form of a vessel in accordance with this invention. People skilled in the art of the design and construction of various types of waste disposal systems will be able to design somewhat other different appearing vessels utilizing the principles or concepts of this invention defined in the appended claims to the use or exercise of routine engineering skill. For this reason, this invention is not to be construed as being limited to solid waste disposal vessels and systems which are constructed in exactly the manner illustrated in the drawing.

DETAILED DESCRIPTION

In the drawings, the vacuum source (1), the liquid holding vessel or tank (2) are shown as block units, both of these are well known in the art and may assume any form or have any particular power as required by the nature and volume of waste material to be handled. From the liquid-holding tank (2) there is a hose (6) which passes through a coupling (5) which is then connected to the exit of the particulate separation vessel (3). The particulate separation vessel on the solids separation and retainiment (3) as shown herein has an inlet (24) connected to the waste area (29) through a hose (4) a coupling (5) and a nozzle (9). Nozzle (9) may have an air vent (9a) to assist in flow if the waste material does not have sufficient fluid to be carried by the vacuum. Hose (4) also may have a coupling (5) so that the nozzle (9) and hose (4) could be connected directly to the liquid-holding tank (2) and the equipment thus operated as the present state of the art for removing liquid waste by transfer to a liquid-holding tank.

The separation vessel (3) has in addition to the inlet (24) and the outlet (23) a baffle (26) and a screen (25). The baffle (24) is placed so that as the combined liquid and particulate matter comes into the separation vessel (3) the mixture is distributed downwardly, this ensures that the only liquid will pass through the screen 25 on its way to the exit (23) and then to the liquid-holding tank. The solid material separation and retainment vessel (3) may be of any desired configuration, however, in this embodiment the solids material (61) filling the interior of the vessel (3) below the screen is of a size to fill the two barrels (51). The size of the vessel being dependant upon the desires of the operator and the system requirements for waste removal. The vessel (3) as shown in FIG. 3 has upper plate (42) and lower plate (41) which are fastened to the side to form vessel (3). The upper plate contains the inlet (24) and outlet (23) and the lower plate containing the exit hole (44). The plates are held to the vessel by screws or bolts or any other well-known method including the necessary gaskets to ensure the integrity of the vessel (3). After the moist solid waste reaches the lead of the screen (25), valve (21) is closed to remove the vacuum from tank (3). The barrels (51) may then be filled by utilizing the lever 22 which opens valve (29) in hole (44) and permitting the moist solid waste to fall into the barrel (51). The operator can control the amount of waste by observation and closing of the valve when the barrel is full or the process could be fully automated. This provides for filling of the barrels without spills or overfills. The vessel (3) is mounted upon a transport means (7). The transport means shown includes leveling means (31) and (32) and structural members (33), (35), (36) and (37) and wheels (38). Because of this easy transportability, the unit can be utilized at the location with the liquid-separation-holding tank and the power source being at a separate location.

In operation, the vacuum source (1) is activated with vacuum then being applied through the holding tank (2) through hose (6), through the vessel (3) and hose (4) to nozzle (9). Nozzle (9) is inserted in the waste holding tank, preferably into the moist solid material so that it would be carried along with the liquid waste in the holding area to the vessel (3). When this combined moist solid waste and liquid waste enters vessel (3), it encounters baffle (26) and is forced downwardly. The waste is unable to pass directly to the exit (23) without first going down and then proceeding upwardly through the filter grate (25) and then out to exit (23). As the water passes through the filter grate (25) and through the exit (23) to liquid-holding tank (2), the solid materials are removed from the liquid and drop to the bottom of the vessel (3). As the vessel (3) fills with solid material, it eventually covers the grate (25) which permits no air or liquid flow through the vacuum system. This could automatically shut off the vacuum system by shutting off the valve (21). The vacuum is then no longer applied to vessel (3). Valve (29) is opened by moving handle (22) to permit waste to flow through opening (24) and load the barrels. Also shown in FIG. 4 is a conveyer system including the rollers (52) and the base (53) to permit easy handling of the barrels (51) when they are full and to permit them to be removed from under the system and placed upon trucks to be disposed of as seen fit.

I claim:

1. A waste system for separating waste containing liquid and a substantial amount of solid matter into individual liquid and solid receptacles comprising:

a vacuum source to provide suction to a first opening of a first receptacle;

a second receptacle having a first opening connected to a second opening of said first receptacle and a second opening connected to a hose having a nozzle to be inserted in waste material containing both liquid and solid waste material;

valve means between said nozzle and said second opening of said second receptacle to admit air to said hose and ensure the flow of said waste material to said second receptacle;

said second receptacle further including a baffle element constructed and arranged to prevent waste input from directly reaching said first opening of said second receptacle;

screening means to restrict the flow of any solid material carried by the liquid waste to the first opening without restricting the flow of the liquid;

valve means connected to said first opening of said second receptacle for controlling the flow of the liquid waste material from said second receptacle to said first receptacle; and said valve means having a closed position disconnecting the vacuum from and stopping the flow of waste into said second receptacle, said second receptacle including an outlet means to remove the solid waste material collected in said second receptacle and valve means in said outlet means of said second receptacle for controlling the removal of solid waste collected in said second receptacle.

2. The waste removal system of claim 1 wherein said valve means in said outlet means of said second receptacle is constructed and arranged to control the feed of said solid waste matter into a container without spilling said waste matter.

* * * * *